(12) United States Patent
Coloma

(10) Patent No.: US 7,793,985 B1
(45) Date of Patent: Sep. 14, 2010

(54) RETRACTABLE AUXILIARY MUD FLAP DEVICE AND ASSOCIATED METHOD

(76) Inventor: Philip Coloma, 477 SE. Chadwick Apt 3, Roseburg, OR (US) 97470

( * ) Notice: Subject to any disclaimer, the term of this patent is extended or adjusted under 35 U.S.C. 154(b) by 43 days.

(21) Appl. No.: 12/283,159

(22) Filed: Sep. 11, 2008

(51) Int. Cl.
*B62D 25/18* (2006.01)

(52) U.S. Cl. ...................................... 280/848; 280/851

(58) Field of Classification Search ................. 280/848, 280/847, 851
See application file for complete search history.

(56) References Cited

U.S. PATENT DOCUMENTS

| | | | |
|---|---|---|---|
| 3,684,311 A | | 8/1972 | Pierce |
| 3,860,262 A | * | 1/1975 | Goings ........................ 280/851 |
| 3,866,943 A | * | 2/1975 | Innis ........................... 280/851 |
| 4,124,221 A | * | 11/1978 | Goings ........................ 280/851 |
| 4,445,700 A | * | 5/1984 | Schroeder ................... 280/851 |
| 5,027,990 A | * | 7/1991 | Sonnenberg ............... 224/42.2 |
| 5,509,690 A | | 4/1996 | Whittington |
| 5,582,431 A | * | 12/1996 | Anderson ................... 280/851 |
| 5,823,586 A | * | 10/1998 | Marley ....................... 293/126 |
| 5,967,554 A | * | 10/1999 | Rea ............................ 280/851 |
| 6,007,102 A | * | 12/1999 | Helmus ...................... 280/849 |
| 6,367,841 B1 | | 4/2002 | Matthew |
| 6,402,200 B1 | * | 6/2002 | Myers ......................... 280/851 |
| 6,565,122 B1 | * | 5/2003 | Hansen ....................... 280/851 |
| 6,799,808 B1 | * | 10/2004 | Walters .................... 298/1 SG |
| 6,886,862 B2 | * | 5/2005 | Matthew .................... 280/848 |
| 2003/0184078 A1 | * | 10/2003 | Grable ....................... 280/847 |
| 2004/0164539 A1 | * | 8/2004 | Bernard ..................... 280/848 |
| 2009/0273176 A1 | * | 11/2009 | Ulgen ........................ 280/851 |
| 2009/0289446 A1 | * | 11/2009 | Proctor ...................... 280/847 |

* cited by examiner

*Primary Examiner*—Jeffrey J Restifo

(57) ABSTRACT

The power-operated mud flap device may include a mud flap adapted to be positioned adjacent to an outer face of the existing vehicle tire. The device may also include a mechanism for automatically displacing the mud flap between a raised and a lowered position defined along a vertical plane. The automatic displacing mechanism may further include a drive shaft coupled to a power actuated motor. First and second linear adjustable driven shafts may be mated to the drive shaft. The driven shafts are preferably registered perpendicular to the drive shaft. Additionally, each driven shaft may include a threaded male member and a female member containing an axial bore. The male member may be rotatably inserted into and extracted from the female member in such a way that the longitudinal length of the driven shaft decreases and increases respectively, thus displacing the mud flap into a raised or lowered position respectively.

14 Claims, 5 Drawing Sheets

RETRACTABLE AUXILIARY MUD FLAP DEVICE AND ASSOCIATED METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to transportation and, more particularly, to a power-operated mud flap device for prohibiting foreign debris and fluids from egressing away from existing vehicle tires.

2. Prior Art

One of the areas that is highly regulated, and one that can cause a great deal of expense to comply with, is the general mandatory use of truck wheel flaps or mud flaps. It cannot be denied that mud flaps are required to protect other vehicles and pedestrians. Conventionally, mud flaps are suspended from the truck body rearward of the rear truck wheels to prevent mud, stones or other debris material from being thrown or ejected in a rearward direction from the truck wheels and striking trailing vehicles or pedestrians. Generally, the mud flaps are merely suspended freely and therefore when the truck is traveling in loose ground or gravel in reverse, the flaps are often torn by coming in contact with the rear tires.

Large trucks, such as dump trucks, used in interstate commerce are required by law to have mud flaps behind each set of rear wheels. Such flaps are required to protect other vehicles and persons from rocks and other debris being ejected from the truck's wheels. The flaps often can be torn from the rear of the vehicle when it is backed into some objects or in the case of a dump truck, when the flap is buried by the load being deposited from the dump truck. The resultant lack of a proper mud flap on many vehicles, thus, gives rise to injuries and property damage.

Another shortcoming of conventional mud flap assemblies is the fact that they only prevent debris launched towards the rear of the truck. It is well known though that in an event like a tire blow out, or when striking a large object, a large truck can send debris in all directions, not just rearward. Thus, these events place any motorist or pedestrians positioned along side the truck at great risk of being struck by such debris.

U.S. Pat. No. 3,684,311 to Pierce discloses a mudguard attachment for automobiles, the sides of the bodies of which curve transversely inwardly at their lower edge portion. The attachment comprises a step member resembling a running board adapted to be extended horizontally along the side of the car body at the lower edge thereof, being secured at its inner edge to said car body and extending transversely outwardly beneath the inwardly curved portion of the car body, extending fore and aft between the wheel wells of said body, and a pair of flexible end plates each disposed transversely to the vehicle and secured at its lower edge to one end of the side step member and extending upwardly into the associated wheel well. Unfortunately, this prior art example does not protect other vehicles and pedestrians positioned perpendicularly along side a vehicle from debris.

U.S. Pat. No. 5,509,690 to Whittington discloses an invention for reducing side spray for trucks and other vehicles. The apparatus includes a flexible flap suspended behind the tires of the vehicle with a stiffening device of relatively elongate construction arranged at the outer edge thereof and extending forwardly therefrom. The flap further lacks any substantial stiffening element at the inner edge thereby effecting the flap so that the flap deflects inwardly along the inner edge of the flap and thereby directs air currents and roadway fluids to the inside of the truck. The stiffening device also obstructs fluids from passing around the outer edge of the flap with a forwardly extending main wall portion and an inwardly directed leading wall portion. Unfortunately, this prior art example also does not protect other vehicles or pedestrians positioned along side a truck from debris ejected perpendicularly from the vehicle tires.

U.S. Pat. No. 6,367,841 to Matthew discloses a mudguard assembly for heavy goods vehicles. A molded mudguard, sized to envelop more than 50% of the upper part and rear of an outer tire of the vehicle is mounted on two rods engageable in sockets bolted to the chassis of the vehicle. The assembly includes a quick release mechanism to enable ease of installation and of removal of the mudguard for access. This prior art example addresses the problem of debris ejecting from the side of a vehicle tire. Unfortunately, however, this example does not provide a means of easily retracting the mudguard to allow the user to clean the tires.

Accordingly, a need remains for a power-operated mud flap device in order to overcome the above-noted shortcomings. The present invention satisfies such a need by providing a device that is convenient and easy to use, is durable in design, and designed for prohibiting foreign debris and fluids from egressing away from existing vehicle tires.

BRIEF SUMMARY OF THE INVENTION

In view of the foregoing background, it is therefore an object of the present invention to provide a device for prohibiting foreign debris and fluids from egressing away from existing vehicle tires. These and other objects, features, and advantages of the invention are provided by a power-operated mud flap device.

The power-operated mud flap device preferably includes a mud flap adapted to be positioned along a longitudinal side of an existing vehicle and further adapted to be juxtaposed adjacent to an outer face of the existing vehicle tires such that the mud flap remains forward of a rear of the existing vehicle tires. The device may also include a mechanism for automatically displacing the mud flap between a raised position and a lowered position defined along a vertical plane extending adjacent to the outer face of the existing vehicle tires. Such raised and lowered positions may further be defined when a rectilinear top edge of the mud flap reaches maximum and minimum heights situated above the existing vehicle tires respectively. The mud flap preferably remains coplanar to the vertical plane when traveling between the raised and lowered positions respectively.

The automatic mud flap displacing mechanism may include a controller adapted to be electrically coupled to an existing vehicle power supply source. Such a controller may also include a user interface for generating and transmitting a control signal based upon receipt of a user input at the user interface. The controller may further include a power-actuated motor with an elongated and rectilinear drive shaft traveling parallel to a longitudinal length of the top edge of the mud flap. Such a drive shaft may be responsive to the control signal and thereby selectively articulates in a reversible rotational direction.

Further, the automatic mud flap displacing mechanism may include first and second linearly adjustable driven shafts operably mated to the drive shaft respectively. Each of such first and second driven shafts may include a male member articulating along mutually exclusive and corresponding rotational directions respectively as the drive shaft is rotated in the reversible rotational direction respectively. Additionally, each of the first and second driven shafts may also include a female member threadably engaged with the male members respectively. Such female members are preferably pivotally connected to the top edge of the mud flap.

The male members may be rotatably inserted and extracted from the female members as the male members rotate along clockwise and counter clockwise directions respectively. A spatial relationship between the drive shaft and the top edge of the mud flap is linearly increased and decreased along the vertical plane when the male members rotate in the counter clockwise and clockwise directions respectively. In this manner, the mud flaps move into a downward position, covering the vehicle tires, when the male members rotate counter clockwise. Conversely, the mud flaps move into an upward position, exposing the vehicle tires, when the male members rotate clockwise.

The drive shaft may include separated first and second threaded sections oriented in a uniform pattern. Such first and second threaded sections are preferably equidistantly offset from a center of the drive shaft and terminate at mutually exclusive end points defined adjacent to axially opposed ends of the mud flap.

Each of the first and second driven shafts may be provided with a beveled gear threadably engaged with the first and second threaded sections respectively so that the beveled gears uniformly articulate the male members along the mutually exclusive rotational directions as the drive shaft rotates along the reversible rotational direction respectively.

A respective longitudinal length of each of the first and second driven shafts may be linearly increased and decreased as each of the male members rotates in clockwise and counter clockwise directions respectively to thereby displace the mud flap along the vertical plane while advantageously limiting undesirable oscillating movements during raising and lowering procedures respectively. In this manner, the mud flaps smoothly transition between upward and downward positions. This prevents the mud flaps from coming into contact with other vehicles or pedestrians or being damaged by wind resistance if they are repositioned while the vehicle is in motion. Further, the automatic mud flap displacing mechanism may include a housing encapsulating the motor and the drive shaft and the beveled gears respectively. Such a housing preferably protects the drive shaft and beveled gears from debris or other containments that may cause a malfunction. A plurality of bearings may be seated between the beveled gears and the housing. Such bearings may effectively facilitate the articulation of male members by stabilizing the beveled gears.

Also, the male members may extend outwardly from the housing and the female members may be disposed exterior of the housing respectively such that the minimum spatial distance is achieved when the male members are fully inserted into the female members respectively.

The female members may also be linearly displaced to the minimum height when the male members rotate in the counter clockwise directions such that the mud flap becomes situated at the lowered position. Also, the male members are preferably articulated about mutually exclusive fulcrum axes defined orthogonal to a fulcrum axis of the drive shaft.

Referring to FIGS. 1, 2, 3a and 3c, each of the first and second driven shafts preferably includes a protective sleeve having an axial bore formed therein and being telescopically positioned about the male and female members respectively. The protective sleeve has a first section statically affixed to the housing and is therefore maintained at a fixed position during the raising and lowering procedures. The protective sleeve further has a second section telescopically interfitted within the first section so that the second section rises and falls in sync with the male member during the raising and lowering procedures.

Notably, the second section is linearly displaced along a longitudinal length of the first section as the male member rotates in the clockwise and counter clockwise directions respectively so that the male member remains covered by the first section as the second section slide away from the male member.

In this manner, the female member and the second section (inner sleeve) are linearly displaced in sync away from the male member and first section (outer sleeve) as the male member rotates in the clockwise and counter clockwise directions respectively. Further, the male member preferably remains continuously covered by the protective sleeve as the male and female members are threadably adapted between elongated and shortened positions respectively.

Further, the automatic mud flap displacing mechanism may include a plurality of tabs situated at a bottom edge of each mud flap. Each of such tabs preferably includes a plurality of buttons. The automatic mud flap displacing mechanism may also include a plurality of sockets located on the existing vehicle. Such sockets may be positioned above the existing vehicle tires in alignment with the tabs. When the mud flap reaches the raised position, the buttons on the tabs interlock with the sockets located on the existing vehicle to secure the mud lap into position.

A method for prohibiting foreign debris and fluids from egressing away from existing vehicle tires may include the first step of providing a mud flap. The method may also include the second step of positioning the mud flap along a longitudinal side of an existing vehicle by juxtaposing the mud flap adjacent to an outer face of the existing vehicle tires such that the mud flap remains forward of a rear of the existing vehicle tires.

The method may further include the third step of automatically displacing the mud flap between a raised position and a lowered position defined along a vertical plane extending adjacent to the outer face of the existing vehicle tires. Further, the method may include the fourth step of maintaining the mud flap coplanar to the vertical plane when the mud flap travels between the raised and lowered positions respectively. The raised and lowered positions may be further defined when a rectilinear top edge of the mud flap reaches maximum and minimum heights situated above the existing vehicle tires respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
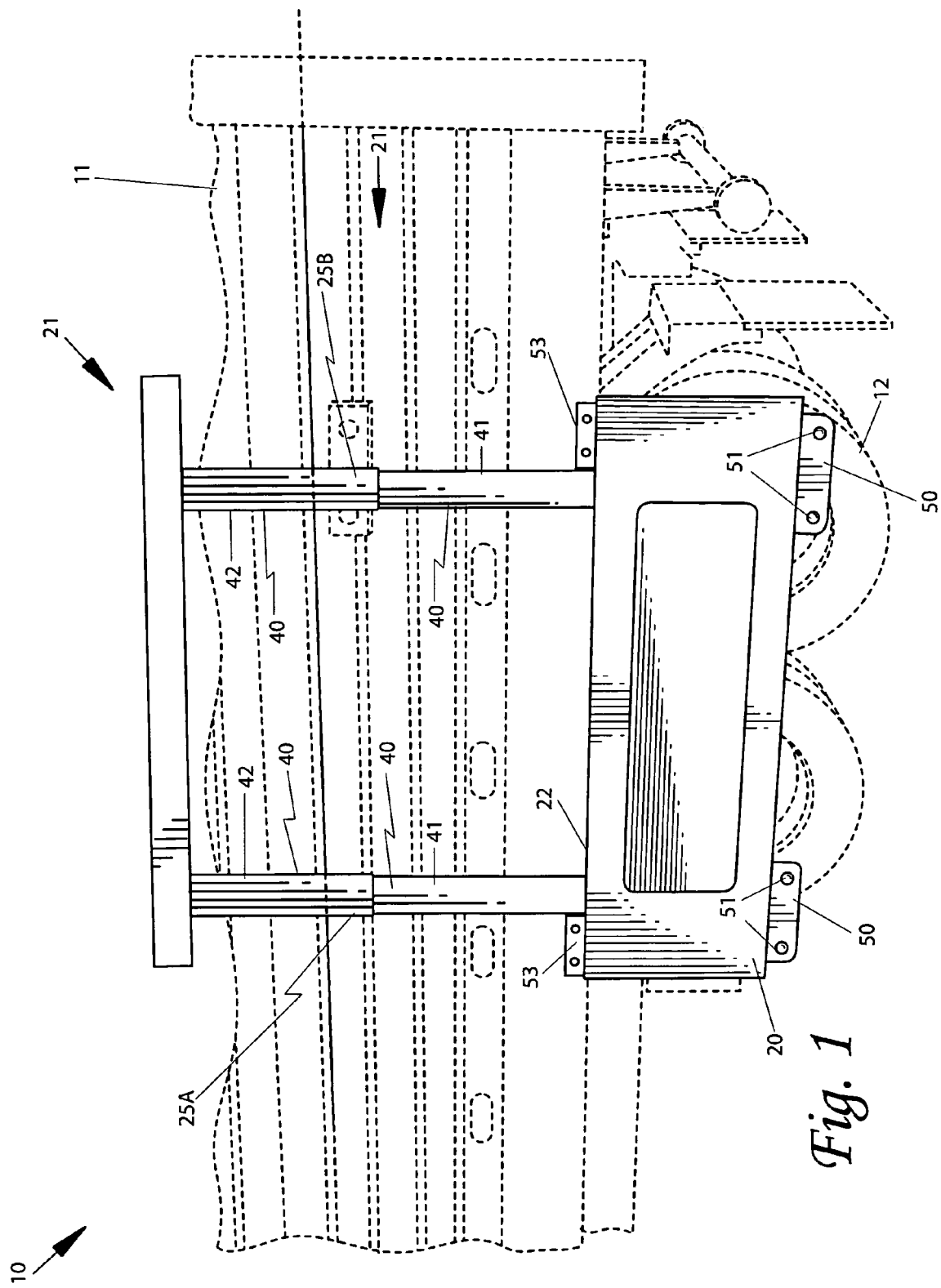
FIG. 1 is a perspective view showing a power-operated mud flap device in a lowered position, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1-3c by the reference numeral 10 and is intended to provide a power-operated mud flap. It should be understood that the device 10 may be used to prohibit foreign debris and fluids from egressing away from many different kinds existing vehicle tires and should not be limited in use to the applications mentioned herein. For example, the present invention may be employed on existing privately owned vehicles as well as existing commercial freight vehicles.

Referring initially to FIGS. 1-3c, the power-operated mud flap device 10 preferably includes a mud flap 20 adapted to be positioned along a longitudinal side of an existing vehicle 11 and further adapted to be juxtaposed adjacent to an outer face of the existing vehicle tires 12 such that the mud flap 20 remains forward of a rear of the existing vehicle tires 12. The device 10 may also include a mechanism 21 for automatically displacing the mud flap 20 between a raised position and a lowered position defined along a vertical plane 28 extending adjacent to the outer face of the existing vehicle tires 12 which is vital for preventing foreign debris and fluids from egressing away from the existing vehicle tires 12.

Such raised and lowered positions may further be defined when a rectilinear top edge 22 of the mud flap 20 reaches maximum and minimum heights situated above the existing vehicle tires 12 respectively. The mud flap 20 preferably remains coplanar to the vertical plane when traveling between the raised and lowered positions respectively so as to decrease the chances of colliding with other vehicles or pedestrians nearby with transition from a raised to lowered position.

Figure 3A:
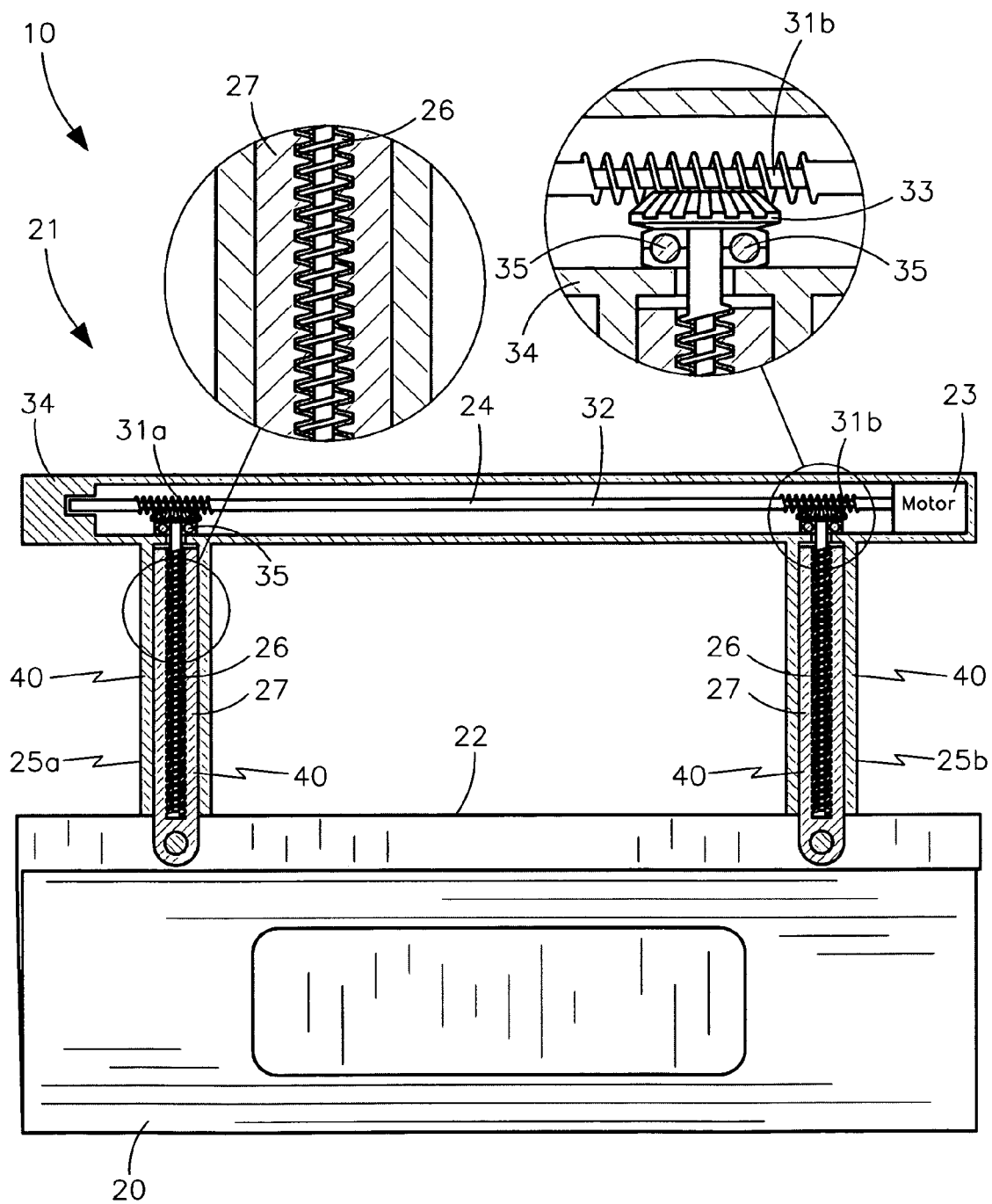
FIG. 3a is a cross sectional view showing the device of FIG. 1 in the raised position with an enlarged partial view of the bevel gear attached to the male member in communication with the drive shaft.
Figure 3B:
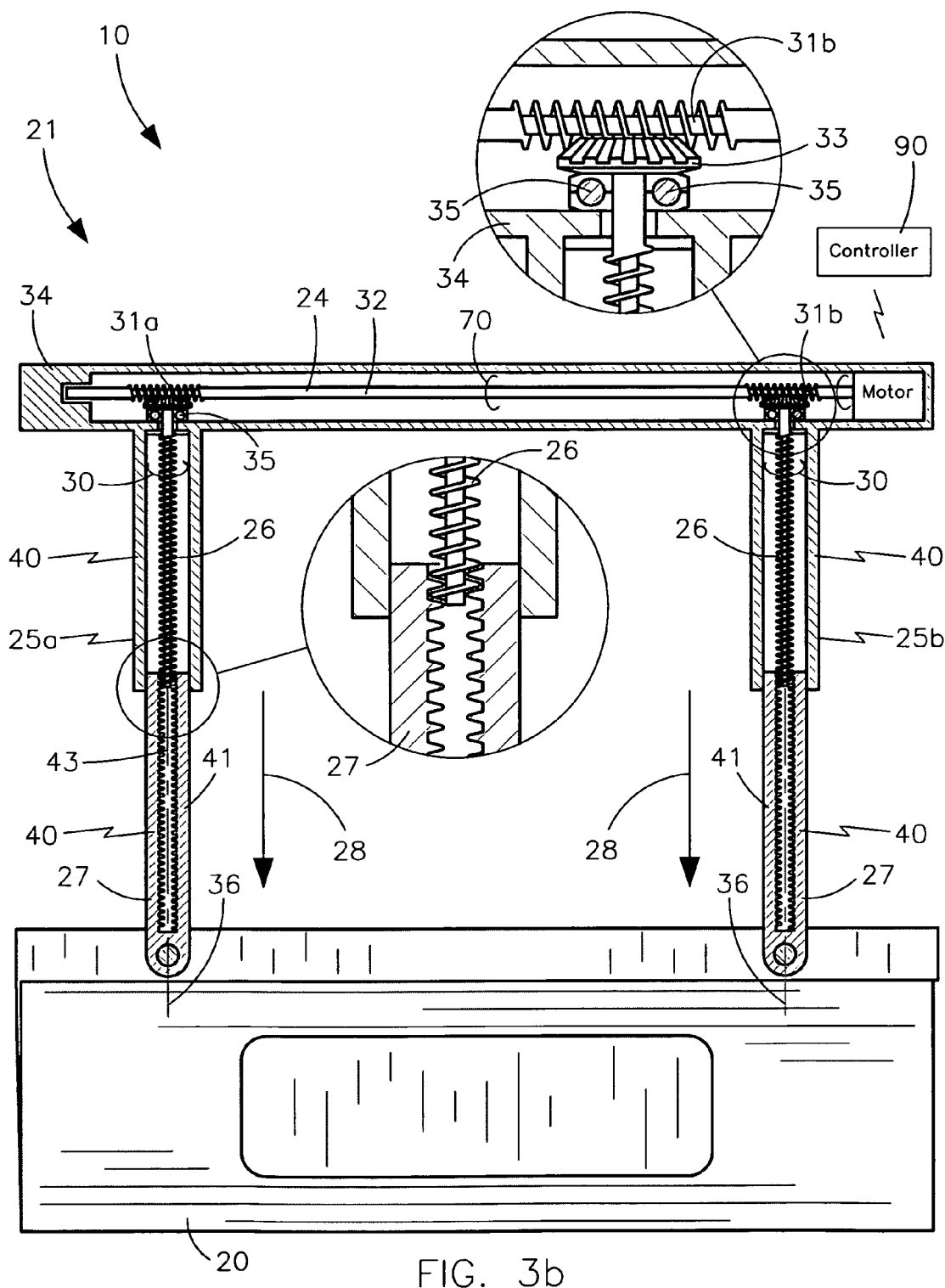
FIG. 3b is a cross sectional view showing the device of FIG. 1 in a lowered position where the male members are nearly fully extracted from the female members.
Figure 3C:
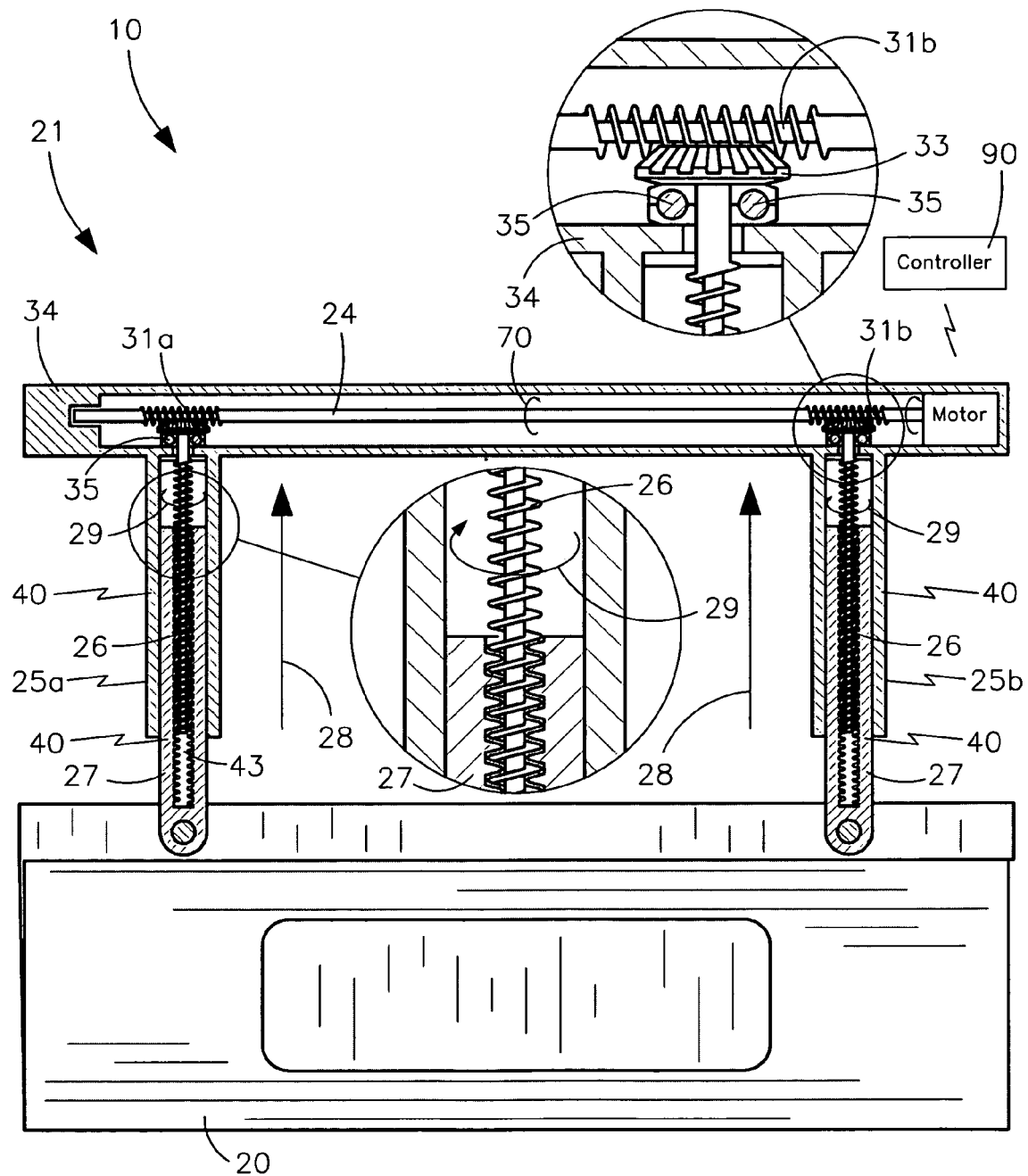
FIG. 3c is a cross sectional view showing the device of FIG. 1 in a raised position where the male members are rotatably inserted into the female member.

Referring to FIGS. 3a, 3b, and 3c, the automatic mud flap displacing mechanism 21 may include a controller adapted to be electrically coupled to an existing vehicle power supply source. Such a controller may also include a user interface for generating and transmitting a control signal based upon receipt of a user input at the user interface. The controller may further include a power-actuated motor 23 with an elongated and rectilinear drive shaft 24 traveling parallel to a longitudinal length of the top edge 22 of the mud flap 20. Such a drive shaft 24 may be responsive to the control signal and thereby selectively articulates in a reversible rotational direction 70. The power actuated motor 23 conveniently provides the requisite force to raise and lower the mud flap 20 into respective positions. In this manner, the user will not have to manually reposition the mud flaps 20. Thus, this advantageous feature allows the user to reposition the mud flaps 20 while the existing vehicle 11 is on the road.

The controller 90 may be wirelessly coupled to the motor, in a manner well known by one skilled in the art. The controller 90 can be a variety of suitable devices that may command the power-actuated motor 23 to selectively engage and disengage based on the user input into the user interface. The power supply is shown in the figures. One skilled in the art, however, understands the power supply may include the existing vehicle engine battery or a portable rechargeable battery, for example.

The controller preferably includes a user interface that may be in the form of a wide variety of panel wherein a user may input a control command either from a keypad, computer-controlled touch screen, actuator switch, etc. For example, the user interface may be a toggle switch located in the passenger compartment of the existing vehicle 11 and may be wirelessly communicatively coupled with the controller and the power-actuated motor 23. In this manner, the user may activate the power-actuated motor 23 from the passenger compartment by toggling the switch located on the user interface.

Referring again to FIGS. 3a, 3b, and 3c, the automatic mud flap displacing mechanism 21 may include first 25A and second 25B linearly adjustable driven shafts operably mated to the drive shaft 24 respectively. Each of such first 25A and second 25B driven shafts may include a male member 26 articulating along mutually exclusive and corresponding rotational directions respectively as the drive shaft 24 is rotated in the reversible rotational direction respectively. Additionally, each of the first 25A and second 25B driven shafts may also include a female member 27 threadably engaged with the male members 26 respectively. Such female members 27 are preferably pivotally connected to the top edge 22 of the mud flap 20. The combination of the first 25A and 25B second driven shafts mated with the drive shaft 24 and the mud flap 20 provide stability and ensure that the mud flaps 20 maintains a constant position during raising and lowering procedures.

Now referring to FIGS. 3b and 3c, the male members 26 may be rotatably inserted and extracted from the female members 27 as the male members 26 rotate along clockwise 29 and counter clockwise 30 directions respectively. A spatial relationship between the drive shaft 24 and the top edge 22 of the mud flap 21 is linearly increased and decreased along the vertical plane 28 when the male members 26 rotate in the counter clockwise 29 and clockwise 30 directions respectively. In this manner, the mud flaps 20 move into a lowered position, covering the existing vehicle tires 12, when the male members 26 rotate counter clockwise. Conversely, the mud flaps may move into a raised position, exposing the existing vehicle tires 12, when the male members 26 rotate in a clockwise 30 direction.

In this manner, the user may lower the mud flaps 20 in order to prohibit foreign debris and fluids from egressing away the side the existing vehicle tires 12. Conversely, the user may raise the mud flaps 20 in order to easily access the vehicle tires 12 for cleaning for maintenance.

The drive shaft 24 may include separated first 31A and second 31B threaded sections oriented in a uniform pattern. Such first 31A and second 31B threaded sections are preferably equidistantly offset from a center 32 of the drive shaft 24 and terminate at mutually exclusive end points defined adjacent to axially opposed ends of the mud flap 20. The separated first 31A and second 31B threaded sections along the drive shaft 24 decreases the probability that the device 21 will become jammed or clogged with debris.

Referring in particular to FIG. 3a, each of the first 25A and second 25B driven shafts may be provided with a beveled gear 33 threadably engaged with the first 31A and second 31B threaded sections respectively so that the beveled gears 33 uniformly articulate the male members 26 along the mutually exclusive rotational directions 29, 30 as the drive shaft 24 rotates along the reversible rotational direction respectively. In this manner, a single power actuated motor 23 may actuate the drive shaft 24 which may in turn actuate both the first 25A and second 25B driven shafts.

Referring to FIGS. 1-3c, the respective longitudinal length of each of the first 25A and second 25B driven shafts may be linearly increased and decreased as each of the male 26 members rotates in clockwise 29 and counter clockwise 30 directions respectively to thereby displace the mud flap 20 along the vertical plane 28 while advantageously limiting undesirable oscillating movements during raising and lowering procedures respectively. In this manner, the mud flaps 20 may be smoothly transitioned between raised and lowered positions while the existing vehicle is in motion. This prevents the mud flaps 20 from colliding with other vehicles or pedestrians or being damaged by wind resistance created by the moving vehicle while the vehicle is in motion. Further, this feature prevents the mud flaps 20 from obstructing the view of other vehicles on the road while transitioning.

Referring to FIGS. 3a, 3b, and 3c, the automatic mud flap displacing mechanism 21 may include a housing 34 encapsulating the motor 23 and the drive shaft 24 and the beveled gears 33 respectively. Such a housing 34 preferably protects the drive shaft 24 and beveled gears 33 from debris or other containments that may cause a malfunction. A plurality of bearings 35 may be seated between the beveled gears 33 and the housing 34. Such bearings 35 may effectively facilitate the articulation of male members 26 by stabilizing the beveled gears 35. Additionally, this feature may prevent the first 25A and second 25B driven shafts from undesirably rocking while the vehicle is in motion.

Figure 2:
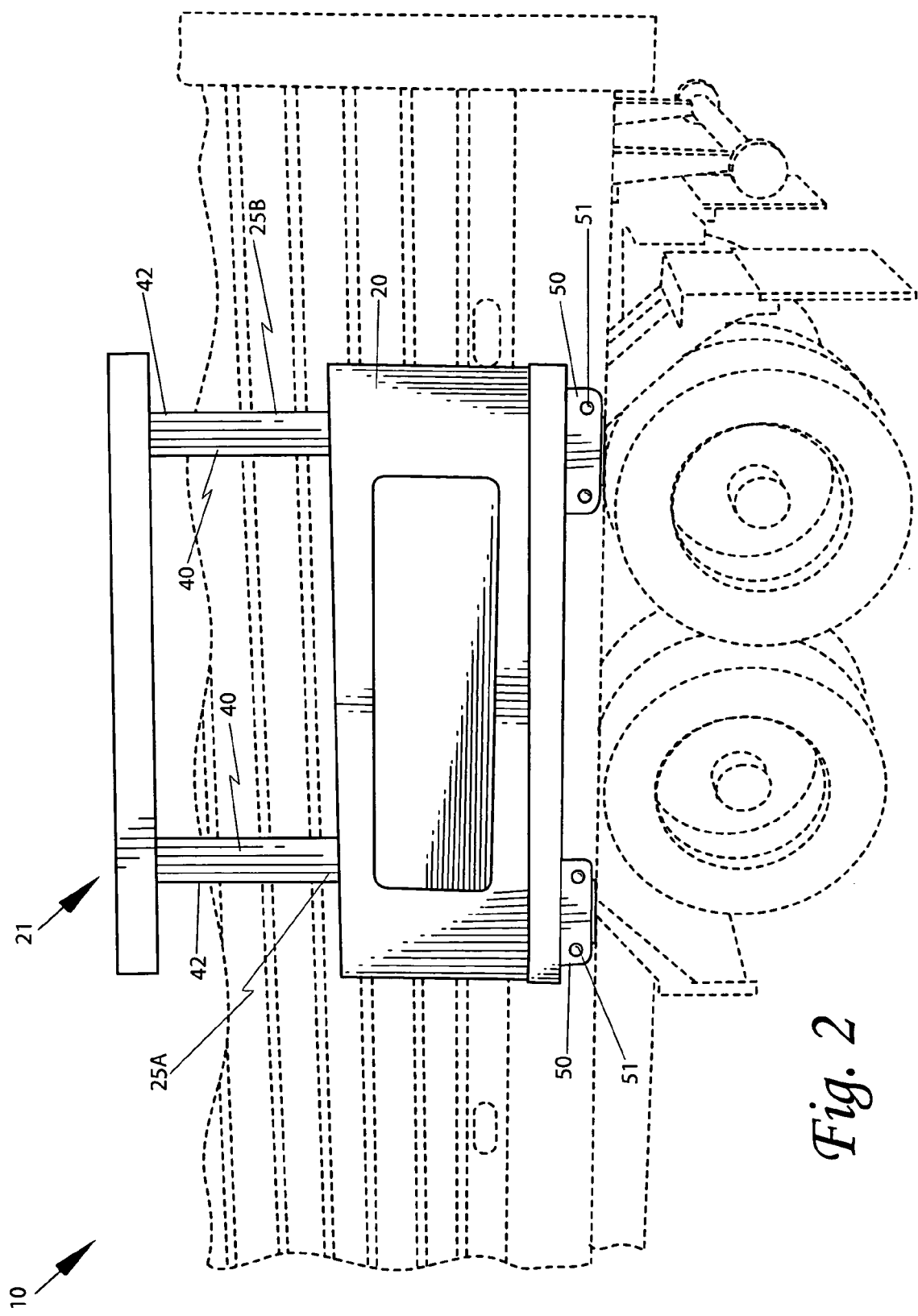
FIG. 2 is a perspective view showing the device of FIG. 1 in a raised position.

Referring to FIGS. 2, 3a, and 3c, the male members 26 may extend outwardly from the housing 34 and the female members 27 may be disposed exterior of the housing 34 respectively such that the minimum spatial distance is achieved when the male members 26 are fully inserted into the female members 27 respectively. When the minimum spatial distance is achieved, the existing vehicle tire 12 is exposed.

Referring to FIGS. 1 and 3b, the female members 27 may also be linearly displaced to the minimum height when the male members 26 rotate in the counter clockwise 30 directions such that the mud flap 20 becomes situated at the lowered position covering the existing vehicle tire 12. Also, the male members 26 are preferably articulated about mutually exclusive fulcrum axes 36 defined orthogonal to a fulcrum axis of the drive shaft 24.

Referring to FIGS. 1, 2, 3a and 3c, each of the first 25A and second 25B driven shafts preferably includes a protective sleeve 40 including an axial bore 43 formed therein and being telescopically positioned about the male and female members 26, 27, respectively. The protective sleeve 40 has a first section 42 statically affixed to the housing 34 and is therefore maintained at a fixed position during the raising and lowering procedures. The protective sleeve 40 further has a second section 41 telescopically interfitted within the first section 42 so that the second section 41 rises and falls in sync with the male member 26 during the raising and lowering procedures.

Notably, the second section 41 is linearly displaced along a longitudinal length of the first section 42 as the male member 26 rotates in the clockwise and counter clockwise directions respectively so that the male member 26 remains covered by the first section 42 as the second section 41 slide away from the male member 26.

The first and second sections 42, 41 may also be referred to as the outer and inner sleeves. The outer sleeve is preferably positioned about the male member 26 and remains at a fixed position as the female member 27 and the inner sleeve 41 linearly travel into and away from the outer sleeve 42 when the mud flap 20 moves between raised and lowered positions. In this manner, the female member 27 and the inner sleeve 41 are linearly displaced in sync away from the male member 26 and outer sleeve 42 as the male member 26 rotates in the clockwise 29 and counter clockwise 30 directions respectively.

The combination of the protective sleeve 40 along with the inner 41 and outer 42 shields protects the male 26 member from debris that may cause the driven shafts 25A, 25B to malfunction when the male member 26 is inserted into the axial bore 43 of the female member 27. Like other elements of this invention, the first 25A and second 25B driven shafts include considerable protective measures to ensure durability.

Referring to FIGS. 1 and 2, the automatic mud flap displacing mechanism 21 may further include a plurality of tabs 50 situated at the bottom of each mud flap 20. Each of such tabs 50 preferably includes a plurality of buttons 51. The automatic mud flap displacing mechanism 21 may also include a plurality of sockets 53 located on the existing vehicle 11. Such sockets 53 may be positioned above the existing vehicle tires 12 in alignment with the tabs 50. When the mud flap 20 reaches the raised position, the buttons 51 on the tabs 50 interlock with the sockets 53 located on the existing vehicle 11 to secure the mud flap 20 into position. This valuable feature prevents the mud flap 20 from becoming prematurely disengaged from a raised position, thus ensuring the safety of nearby vehicles and pedestrians.

In use, method for prohibiting foreign debris and fluids from egressing away from existing vehicle tires 12 may include the first step of providing a mud flap 20. The method may also include the second step of positioning the mud flap 20 along a longitudinal side of an existing vehicle 11 by juxtaposing the mud flap 20 adjacent to an outer face of the existing vehicle tires 12 such that the mud flap 20 remains forward of a rear of the existing vehicle tires 12.

The method may further include the third step of automatically displacing the mud flap 20 between a raised position and a lowered position defined along a vertical plane 28 extending adjacent to the outer face of the existing vehicle tires 12. Further, the method may include the fourth step of maintaining the mud flap 20 coplanar to the vertical plane 28 when the mud flap travels between the raised and lowered positions respectively. The raised and lowered positions may be further defined when a rectilinear top edge 22 of the mud flap 20 reaches maximum and minimum heights situated above the existing vehicle tires 12 respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A power-operated mud flap device for prohibiting foreign debris and fluids from egressing away from existing vehicle tires, said power-operated mud flap device comprising:

a mud flap adapted to be positioned along a longitudinal side of an existing vehicle; and
    means for automatically displacing said mud flap between a raised position and a lowered position defined along a vertical plane extending adjacent to an outer face of the existing vehicle tires, the raised and lowered positions further being defined when a rectilinear top edge of said mud flap reaches maximum and minimum heights situated above the existing vehicle tires respectively, said mud flap remaining coplanar to the vertical plane when traveling between the raised and lowered positions respectively;
    wherein said automatic mud flap displacing means comprises
    a controller adapted to be electrically coupled to an existing vehicle power supply source, said controller including a user interface for generating and transmitting a control signal based upon receipt of a user input at said user interface;
    a power-actuated motor having an elongated and rectilinear drive shaft traveling parallel to a longitudinal length of said top edge of said mud flap, said drive shaft being responsive to said control signal and thereby selectively articulating in a reversible rotational direction; and
    first and second linearly adjustable driven shafts operably mated to said drive shaft respectively, each of said first and second driven shafts including a male member articulating along mutually exclusive and corresponding rotational directions respectively as said drive shaft is rotated in the reversible rotational direction respectively, each of said first and second driven shafts further including a female member threadably engaged with said male members respectively, said female members further being pivotally connected to said top edge of said mud flap;
    wherein said male members are rotatably inserted and extracted from said female members as said male members rotate along clockwise and counter clockwise directions respectively;
    wherein a spatial relationship between said drive shaft and said top edge of said mud flap is linearly increased and decreased along the vertical plane when said male members rotate in the counter clockwise and clockwise directions respectively.

2. The power-operated mud flap device of claim 1, wherein said drive shaft comprises:

separated first and second threaded sections oriented in a uniform pattern, said first and second threaded sections being equidistantly offset from a center of said drive shaft and terminating at mutually exclusive end points defined adjacent to axially opposed ends of said mud flap;
    wherein each of said first and second driven shafts is provided with a beveled gear threadably engaged with said first and second threaded sections respectively so that said beveled gears uniformly articulate said male members along the mutually exclusive rotational directions as said drive shaft rotates along the reversible rotational direction respectively.

3. The power-operated mud flap device of claim 2, wherein a respective longitudinal length of each of said first and second driven shafts is linearly increased and decreased as each of said male members rotates in clockwise and counter clockwise directions respectively to thereby displace said mud flap along the vertical plane while limiting undesirable oscillating movements during raising and lowering procedures respectively.

4. The power-operated mud flap device of claim 3, wherein said automatic mud flap displacing means further comprises:

a housing encapsulating said motor and said drive shaft and said beveled gears respectively;
    wherein said male members extend outwardly from said housing and said female members are disposed exterior of said housing respectively such that the minimum spatial distance is achieved when said male members are fully inserted into said female members respectively.

5. The power-operated mud flap device of claim 4, wherein said female members are linearly displaced to the minimum height when said male members rotate in the counter clockwise directions such that said mud flap becomes situated at the lowered position.

6. The power-operated mud flap device of claim 4, wherein each of said first and second drive shafts further comprises:

a protective sleeve having an axial bore formed therein and being telescopically positioned about said male and female members respectively, said protective sleeve having a first section statically affixed to said housing and maintained at a fixed position during the raising and lowering procedures, said protective sleeve further having a second section telescopically interfitted within said first section, said second section rising and falling in sync with said male member during the raising and lowering procedures;
    wherein said second section is linearly displaced along a longitudinal length of said first section as said male member rotates in the clockwise and counter clockwise directions respectively so that said male member remains covered by said first section as said second section slide away from said male member.

7. The power-operated mud flap device of claim 1, wherein said male members are articulated about mutually exclusive fulcrum axes defined orthogonal to a fulcrum axis of said drive shaft.

8. A power-operated mud flap device for prohibiting foreign debris and fluids from egressing away from existing vehicle tires, said power-operated mud flap device comprising:
- a mud flap adapted to be positioned along a longitudinal side of an existing vehicle and further being adapted to be juxtaposed adjacent to an outer face of the existing vehicle tires such that said mud flap remains forward of a rear of the existing vehicle tires; and
- means for automatically displacing said mud flap between a raised position and a lowered position defined along a vertical plane extending adjacent to the outer face of the existing vehicle tires, the raised and lowered positions further being defined when a rectilinear top edge of said mud flap reaches maximum and minimum heights situated above the existing vehicle tires respectively, said mud flap remaining coplanar to the vertical plane when traveling between the raised and lowered positions respectively;
- wherein said automatic mud flap displacing means comprises:
- a controller adapted to be electrically coupled to an existing vehicle power supply source, said controller including a user interface for generating and transmitting a control signal based upon receipt of a user input at said user interface;
- a power-actuated motor having an elongated and rectilinear drive shaft traveling parallel to a longitudinal length of said top edge of said mud flap, said drive shaft being responsive to said control signal and thereby selectively articulating in a reversible rotational direction; and
- first and second linearly adjustable driven shafts operably mated to said drive shaft respectively, each of said first and second driven shafts including a male member articulating along mutually exclusive and corresponding rotational directions respectively as said drive shaft is rotated in the reversible rotational direction respectively, each of said first and second driven shafts further including a female member threadably engaged with said male members respectively, said female members further being pivotally connected to said top edge of said mud flap;
- wherein said male members are rotatably inserted and extracted from said female members as said male members rotate along clockwise and counter clockwise directions respectively;
- wherein a spatial relationship between said drive shaft and said top edge of said mud flap is linearly increased and decreased along the vertical plane when said male members rotate in the counter clockwise and clockwise directions respectively.

9. The power-operated mud flap device of claim 8, wherein said drive shaft comprises:
- separated first and second threaded sections oriented in a uniform pattern, said first and second threaded sections being equidistantly offset from a center of said drive shaft and terminating at mutually exclusive end points defined adjacent to axially opposed ends of said mud flap;
- wherein each of said first and second driven shafts is provided with a beveled gear threadably engaged with said first and second threaded sections respectively so that said beveled gears uniformly articulate said male members along the mutually exclusive rotational directions as said drive shaft rotates along the reversible rotational direction respectively.

10. The power-operated mud flap device of claim 9, wherein a respective longitudinal length of each of said first and second driven shafts is linearly increased and decreased as each of said male members rotates in clockwise and counter clockwise directions respectively to thereby displace said mud flap along the vertical plane while limiting undesirable oscillating movements during raising and lowering procedures respectively.

11. The power-operated mud flap device of claim 10, wherein said automatic mud flap displacing means further comprises:
- a housing encapsulating said motor and said drive shaft and said beveled gears respectively;
- wherein said male members extend outwardly from said housing and said female members are disposed exterior of said housing respectively such that the minimum spatial distance is achieved when said male members are fully inserted into said female members respectively.

12. The power-operated mud flap device of claim 11, wherein said female members are linearly displaced to the minimum height when said male members rotate in the counter clockwise directions such that said mud flap becomes situated at the lowered position.

13. The power-operated mud flap device of claim 11, wherein each of said first and second drive shafts further comprises:
- a protective sleeve having an axial bore formed therein and being telescopically positioned about said male and female members respectively, said protective sleeve having a first section statically affixed to said housing and maintained at a fixed position during the raising and lowering procedures, said protective sleeve further having a second section telescopically interfitted within said first section, said second section rising and falling in sync with said male member during the raising and lowering procedures;
- wherein said second section is linearly displaced along a longitudinal length of said first section as said male member rotates in the clockwise and counter clockwise directions respectively so that said male member remains covered by said first section as said second section slide away from said male member.

14. The power-operated mud flap device of claim 8, wherein said male members are articulated about mutually exclusive fulcrum axes defined orthogonal to a fulcrum axis of said drive shaft.

* * * * *